United States Patent [19]

Hakamada et al.

[11] Patent Number: 4,729,027
[45] Date of Patent: Mar. 1, 1988

[54] PICTURE-IN-PICTURE TELEVISION RECEIVER

[75] Inventors: Kunio Hakamada, Tokyo; Hideo Wakabayashi, Chiba, both of Japan

[73] Assignee: Sony Corporation, Tokyo, Japan

[21] Appl. No.: 469

[22] Filed: Jan. 5, 1987

[30] Foreign Application Priority Data

Jan. 7, 1986 [JP] Japan ............................... 61-1125

[51] Int. Cl.⁴ .......................................... H04N 5/272
[52] U.S. Cl. ...................................... 358/183; 358/22
[58] Field of Search ................. 358/183, 22, 182, 181

[56] References Cited

U.S. PATENT DOCUMENTS

| | | | |
|---|---|---|---|
| 4,070,695 | 1/1978 | Scholz et al. | 358/183 X |
| 4,139,860 | 2/1979 | Micic et al. | 358/22 |
| 4,238,773 | 12/1980 | Tsuboka et al. | 358/183 |
| 4,266,242 | 5/1981 | McCoy | 358/183 X |
| 4,267,560 | 5/1981 | Ishikawa et al. | 358/22 |
| 4,278,993 | 7/1981 | Suzuki | 358/183 X |
| 4,621,259 | 11/1986 | Schepers et al. | 358/183 X |
| 4,636,864 | 1/1987 | Annegarn et al. | 358/183 X |
| 4,665,438 | 5/1987 | Miron et al. | 358/22 X |
| 4,682,234 | 7/1987 | Naimpally | 358/183 |

OTHER PUBLICATIONS

TV Receiver Puts Two Pictures on Screen at Same Time, by Manfred Ullrich and Max Hegendoerfer, Electronics/Sep. 1, 1977.
Fully Digitalized Color Picture in Picture Television System, by Michio Masuda et al., IEEE Transactions on Consumer Electronics, vol. CE-25, Feb. 1979.

Primary Examiner—James J. Groody
Assistant Examiner—E. Anne Faris
Attorney, Agent, or Firm—Philip M. Shaw, Jr.

[57] ABSTRACT

According to the invention, there is provided a so-called picture-in-picture type television receiver in which a sub-picture screen is displayed within a main picture screen in a picture-in-picture fashion. When a picture based on a base band video signal from an external source such as a VTR, for example, is displayed on the sub-picture screen, if the sub-picture channel selecting means is then operated, the picture of a broadcast television channel is then automatically displayed on the sub-picture screen. This feature allows the omission of a video signal source switching means for the sub-picture, thus protecting the viewer from being confused when using the controls of the television receiver.

7 Claims, 13 Drawing Figures

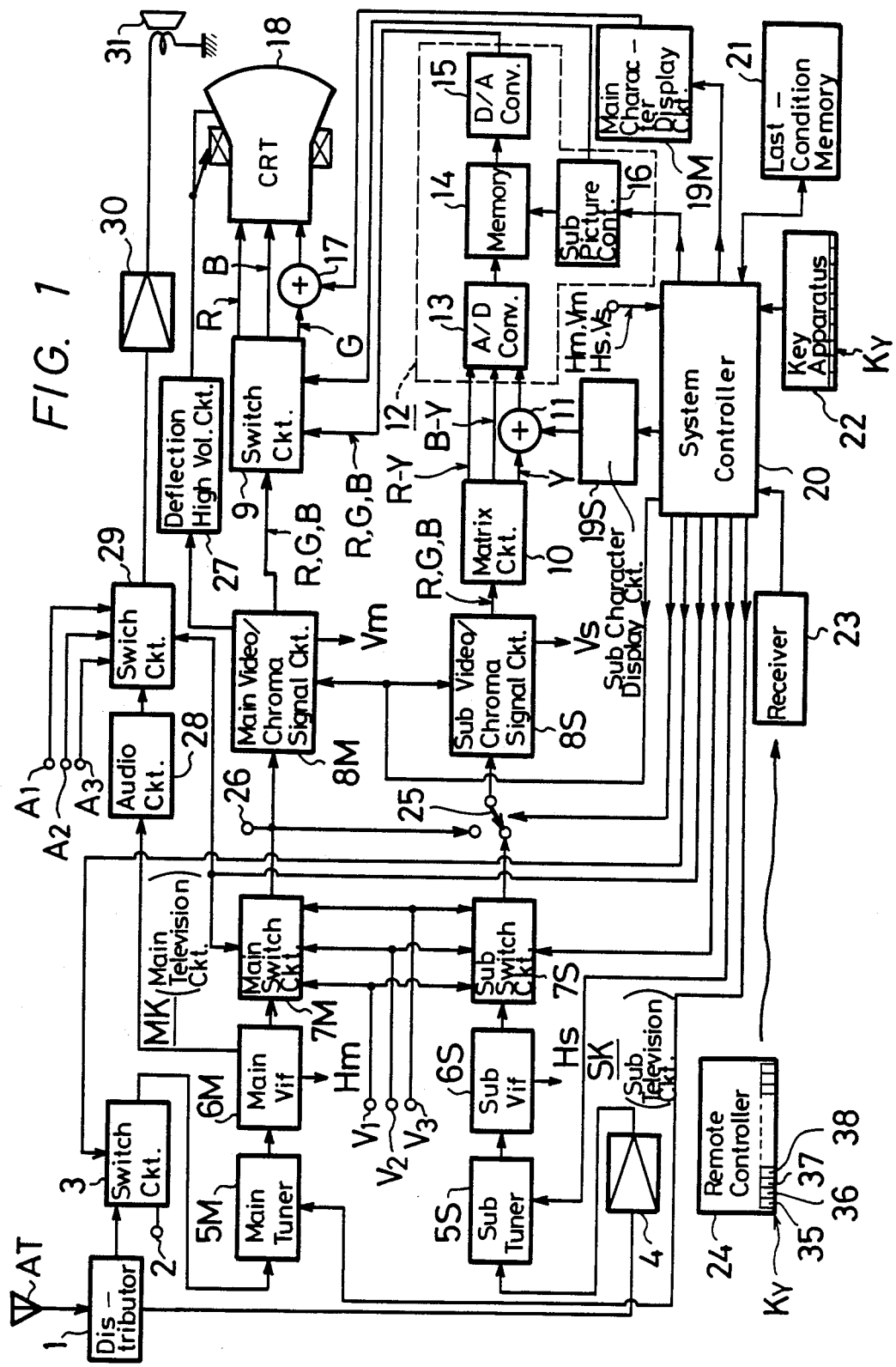

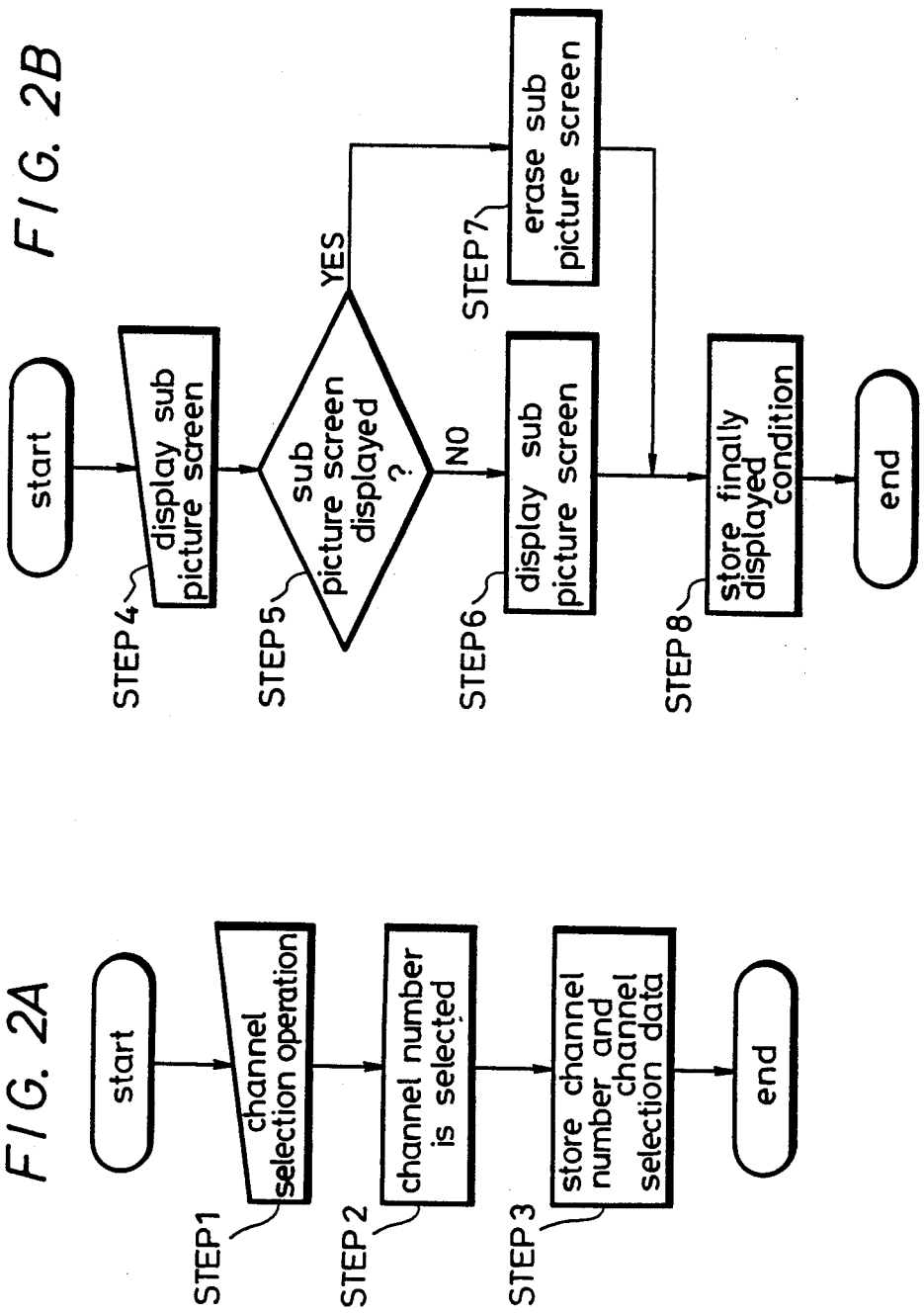

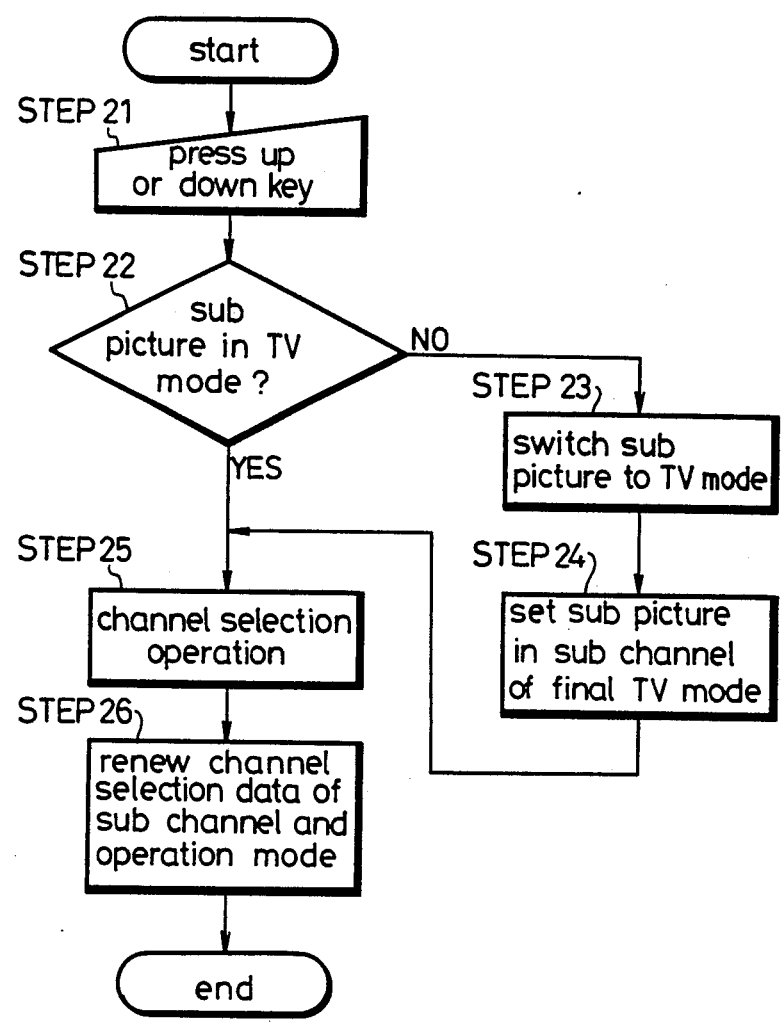

PICTURE-IN-PICTURE TELEVISION RECEIVER

BACKGROUND OF THE INVENTION

1. Field of the Invention

The present invention relates generally to television receivers and, more particularly, is directed to a television receiver of the so-called picture-in-picture type in which a sub-picture screen is displayed within a main picture screen in a picture-in-picture fashion.

2. Description of the Prior Art

In the prior art, there is known a television receiver of a so-called picture-in-picture type in which a sub-picture screen is displayed within a main picture screen in an inset fashion.

As will be described later, the picture-in-picture type television receiver is provided with a memory to reproduce a picture on a sub-picture screen. When the writing of a video signal into the memory and the reading of the same video signal out of the memory are alternately carried out continuously, a real moving picture can be displayed on the sub-picture screen.

According to the prior art picture-in-picture type television receiver, the following signal sources for the main picture displayed on the main picture screen and the sub-picture displayed on the sub-picture screen are employed: a high frequency signal from, for example, a television broadcast, a CATV and the like, and an external, base band video signal from an apparatus such as a VTR (video tape recorder), a video disc and so on.

With respect to television broadcasts, it often happens that two interesting programs, such as a baseball program from a certain broadcast station and a golf program from other broadcast station, are broadcast simultaneously. In such a case, some prior art picture-in-picture type television receivers can not utilize effectively the sub-picture function to reproduce the two separate programs on the main and sub-picture screens. So, it is desired that the picture-in-picture type television receiver can receive and simultaneously display the high frequency signals of two systems.

However, when the picture-in-picture type television receiver is provided with two tuners for that purpose, if channel selection keys from "0" to "9" (ten keys), an up key and a down key for incrementing and decrementing the channel number are provided for each tuner, the keys become too numerous, causing useless confusion and misoperation by the user and so on.

In addition, since the television receiver and a remote controller for it are restricted in the area in which the operation keys used for various kinds of control operations can be mounted, it is difficult to increase the number of operation keys.

The switch between the television broadcast receiving mode (TV mode) and the external video signal reproducing mode (video mode) must be done within the picture-in-picture type television receiver. If the mode switching and the channel selection by the tuner are associated, this makes the circuit arrangement thereof complicated. In the prior art receivers of this type, the mode switching and the channel selection are carried out independently.

However, if the mode switching keys and the channel selection operation mechanism are separately provided for the main picture and the sub-picture tuners, the number of keys is increased even more, thus making the above mentioned defects more serious.

OBJECTS AND SUMMARY OF THE INVENTION

Accordingly, it is an object of this invention to provide an improved television receiver of a so-called picture-in-picture type.

It is another object of this invention to provide a television receiver of a picture-in-picture type in which the operation section is simplified in construction so that the user can be protected from the confusion in use.

It is a further object of this invention to provide a television receiver of a picture-in-picture type in which the operation mode of a sub-picture can be positively switched without control operation means for switching the operation mode of the sub-picture.

According to one aspect of the present invention, there is provided a picture-in-picture type television receiver in which a sub-picture screen is displayed within a main picture screen in a picture-in-picture fashion and a sub-picture circuit selectively reproduces on the sub-picture screen a picture from either a broadcast channel or a picture from an external input video signal. The sub-picture circuit includes a viewer operable channel selector for choosing a particular broadcast channel for reproduction on the sub-picture screen and means for causing the sub-picture circuit to reproduce a picture from a broadcast channel on the sub-picture screen if the sub-picture channel selector is operated at a time when the picture based on the external input video signal is being reproduced on the sub-picture screen.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 1 is a block diagram showing the whole arrangement of an embodiment of a television receiver according to the present invention;

FIGS. 2A to 2D are respectively flow charts to which reference will be made in explaining the operations for reproducing main and sub-pictures according to the embodiment of the present invention;

FIG. 4 is a flow chart to which reference will be made in explaining the channel selection operation of a sub-channel according to the embodiment of the present invention.

DESCRIPTION OF THE PREFERRED EMBODIMENT

Figure 2D:
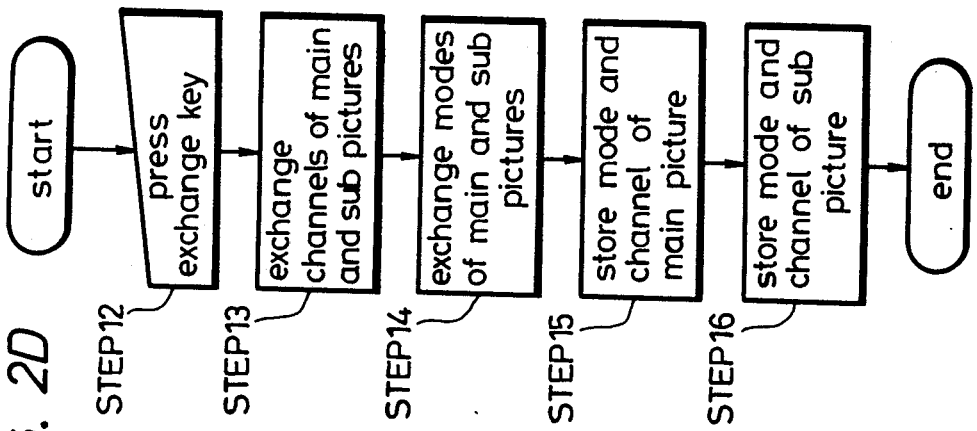

An embodiment of a television receiver according to the present invention will now be described with reference to the attached drawings.

FIG. 1 is a block diagram showing an overall circuit arrangement of one embodiment of the television receiver according to the present invention.

Referring to FIG. 1, the television receiver of this invention includes a main television circuit MK and a sub-television circuit SK. From a video signal supplied by the main television circuit MK, a main picture is displayed on the whole picture screen of a cathode ray tube 18, whereas from a video signal supplied by the sub-television circuit SK, a sub-picture is displayed on one portion of the main picture screen in such a manner that the sub-picture is inset into the main picture. These main and sub-television circuits MK and SK include main and sub-tuners 5M, 5S, main and sub-video intermediate frequency circuits 6M, 6S and main and sub-video/chroma signal circuits 8M, 8S, respectively.

Further, the television receiver of the invention is provided with external video signal input terminals $V_1$, $V_2$ and $V_3$ to which displayed video signals (base band signals) from a VTR (video tape recorder) or the like are supplied. The video signals from these external input terminals $V_1$, $V_2$ and $V_3$ can be selectively switched in place of the video signals from the tuners 5M and 5S by the main and the sub-switching circuits 7M and 7S provided in the television circuits MK and SK. The signal selected by the switching circuit 7M is then supplied to the cathode ray tube 18 to be displayed on its picture screen.

The sub-television circuit SK also includes a video signal processor circuit 12 for displaying the sub-picture on the picture screen of the cathode ray tube 18. The video signal processor circuit 12 controls the kinds of sub-pictures, such as, a live picture, a still picture, a step-by-step picture or the like, the number of sub-pictures, the position of the sub-picture on the main picture screen, etc. By "live" picture is meant that the displayed image is animated rather than static.

The main and sub-television circuits MK and SK are respectively provided with main and sub-character display circuits 19M and 19S to display picture discriminating indications such as the reception channel of a television broadcast or the ordinary number of the external video signal input terminals, for example, on the respective main picture screen and the sub-picture screen in an inset fashion.

There is provided a controller 20 which includes a micro-computer. The respective sections of the television receiver are controlled by this system controller 20 as will be explained in greater detail hereinafter.

The circuit arrangement of the television receiver according to this invention will now be described more fully. A television broadcast signal received by an antenna AT is supplied to a distributor 1. The distributor 1 supplies the received signal through a switching circuit 3 to the main tuner 5M without substantially attenuating the same and also supplies a portion of the received signal to the sub-tuner 5S. The received signal to be applied to the sub-tuner 5S is first amplified by a high frequency amplifier 4. The switching circuit 3 selectively switches between the antenna input signal from the distributor 1 and a high frequency input signal from a descrambler used for receiving a cable television broadcast or the like from an auxiliary input terminal 2 and supplies one of them to the main tuner 5M.

The video signal from the main tuner 5M is supplied to the main video intermediate frequency circuit 6M. Then, the video intermediate frequency signal therefrom is supplied to the main switching circuit 7M which can be selectively switched between this video signal and the external video signals from the external video input terminals $V_1$ to $V_3$. The signal selected by the switching circuit 7M is supplied to the main video/chroma signal circuit 8M. A monitor output terminal 26 is connected to the output side of the main switching circuit 7M. This main video/chroma signal circuit 8M generates red, green and blue color signals R, G and B which are then fed to a switching circuit 9.

The audio intermediate frequency signal from the main video intermediate frequency circuit 6M is supplied to an audio circuit (incorporating therein a sound multiplexing decoder circuit) 28. The audio signal from the audio circuit 28 is supplied to a switching circuit 29 which can be selectively switched between this audio signal and the external audio signals displayed from the VTR and the like and supplied thereto from external audio signal input terminals A1, A2 and A3, respectively, corresponding to the above mentioned external video signal input terminals $V_1$, $V_2$ and $V_3$. The audio signal selected by the switching circuit 29 is supplied through a low frequency amplifier 30 to a loudspeaker 31.

The horizontal and vertical synchronizing signals from the main video/chroma signal circuit 8M are supplied to a deflection/high voltage circuit 27. The deflection signal and the high DC voltage from the circuit 27 are supplied to the cathode ray tube 18.

The video signal from the sub-tuner 5S is supplied to the sub-video intermediate frequency circuit 6S. The video intermediate frequency signal therefrom is supplied to the sub-switching circuit 7S which selectively switches between this video signal and the external video signals from the external video signal input terminals $V_1$ to $V_3$. A switch 25 selects between the video signal selected by the switching circuit 7S and the video signal from the main switching circuit 7M and supplies the chosen video signal to the sub-video/chroma signal circuit 8S. From this sub-video/chroma signal circuit 8S, there are derived red, green and blue color signals R, G and B. These red, green and blue color signals R, G and B are supplied to a matrix circuit 10 in which they are converted to a luminance signal Y and red and blue color difference signals R-Y and B-Y, respectively, which are then fed to an A/D (analog-to-digital) converter 13 in the video signal processor circuit 12.

The A/D converter 13 is a time division type A/D converter as disclosed, for example, in Japanese published patent application No. 60-47792. The digital signal from the A/D converter 13 is supplied to a memory 14 and then written therein. The digital signal read out from the memory 14 is supplied to a D/A (digital-to-analog) converter 15 and is thereby converted to an analog signal. In the video signal processor circuit 12, sampling lines and picture elements of the video signal are selected and other lines and picture elements are thrown away or removed in correspondence with the ratio between the sizes of the main picture screen and the sub-picture screen. The memory 14 has frame (or field) memory areas corresponding to the maximum number of displayable sub-pictures, for example, four frame memory areas. This memory 14 is controlled by a sub-picture controller 16 so as to specify the kinds of sub-pictures, such as a live picture, a still picture, a step-by-step picture and so on, the number of sub-pictures, the position of the sub-picture on the main picture and the like.

When the sub-picture is displayed as a live, i.e. a real moving picture, the video signal is alternately written in and read out from the memory 14 continuously and repeatedly; when the sub-picture is displayed as a still picture, the video signal is written in the memory 14 for a selected frame or field period and then read out from the memory 14 repeatedly; and when the sub-picture is displayed as a step-by-step picture, a plurality of video signals are written in the memory 14 at different times corresponding to different frames or field periods and then read out therefrom repeatedly (see Japanese laid-open patent application No. 56-27573). The number of the sub-picture screens inset into the main picture screen is determined on the basis of the number of memory areas in the memory 14 which are used. The contents or pictures of the sub-picture screen can be a real moving picture, a still picture or a step-by-step picture based on the video signal from the sub-video/chroma signal circuit 8S or on the video signal from the main video/chroma signal circuit 8M. The switching of these video signals is carried out by the above mentioned switch 25. The picture contents on the main picture screen and the sub-picture screen can be exchanged with each other by simultaneously switching the reception channels of the main and sub-tuners 5M and 5S or by simultaneously switching the main and sub-switching circuits 7M and 7S.

The respective color signals from the main/video chroma signal circuit 8M and the respective color signals from the D/A converter 15 are supplied to the switching circuit 9 in which both groups of respective color signals are switched at appropriate timing intervals such that the sub-picture screen is inset into one portion of the main picture screen at a selected, predetermined position. This switching circuit 9 is controlled by the sub-picture controller 16, which is controlled by the system controller 20. The video signal from the switching circuit 9 is supplied to the cathode ray tube 18.

The main picture discrimination indicating signal, such as a signal indicative of the main channel number, is formed by the main character display circuit 19M and is added to the video signal by an adder 17 connected between the switching circuit 9 and the cathode ray tube 18. In this example, the adder 17 is interposed only in the transmission path of the green color signal G to thereby superimpose a green picture discrimination indication upon the main picture screen. It is of course possible that this picture discrimination indication can be made by using other colors.

The sub-picture discrimination indicating signal, formed by the sub-character display circuit 19S and which could be indicative of the channel number selected by the sub-tuner 5S, for example, is added to the sub-video signal by an adder 11 connected between the matrix circuit 10 and the A/D converter 13. In this example, an adder 11 is interposed only in the transmission path of the luminance signal Y to thereby superimpose a white picture discrimination indication on the sub-picture screen. Also, it is possible that this picture discrimination indication can be made by using other colors.

The channel selections in the above mentioned main tuner 5M and sub-tuner 5S are carried out by channel selection signals from the system controller 20. The switching circuits 3, 7M, 7S, 29 and the switch 25 are also selectively switched under the control of the system controller 20. The main and sub-video/chroma signal circuits 8M and 8S are subjected to blanking by the system controller 20 for a short period upon the up and down scanning channel selection operation. Alternatively, this blanking may be carried out by a blanking switch that is provided at the pre-stage of the cathode ray tube 18. Further, main and sub-horizontal synchronizing signals Hm and Hs from the main and sub-video intermediate frequency circuits 6M and 6S and main and sub-vertical blanking signals (vertical signals) Vm and Vs from the main and sub-video/chroma signal circuits 8M and 8S are supplied to the system controller 20. The main picture and sub-picture discrimination indicating signal circuits 19M and 19S and the sub-picture controller 16 are controlled by the system controller 20.

A last-condition memory 21 is provided which stores, under the control of the system controller 20, the selected channels of the main and sub-tuners 5M and 5S, the switch conditions of the switching circuits 7M and 7S, the control conditions of the sub-picture controller 16 and so on when the power of the television receiver is turned off. When the television receiver is powered on again, the conditions of the respective circuits presented when the power of the television receiver was last turned off are displayed under the control of the system controller 20.

A key apparatus 22 is connected to the system controller 20 and is provided with various kinds of keys KY to control the television receiver.

Reference numeral 24 denotes a remote controller (commander) which is also provided with various kinds of keys KY to control the television receiver. This remote controller 24 is also provided with a transmitter (not shown) to transmit a remote control signal based on the corresponding key operation. A receiver 23 for receiving the signal transmitted from the transmitter of the remote controller 24 is connected to the system controller 20. The remote control signal can be transmitted by means of a light beam, radio wave, sound wave and so on.

By way of example, the keys KY of the key apparatus 22 or the remote controller 24 will be enumerated as follows: a power key 33; a recall key 34 (used to display the picture discrimination indication such as the channel number); a mute key (used to mute the sound); ten keys (designated generally by the reference numeral 35) used to select the reception channel and the number of the external video signal input terminal; a TV (television)/VTR change-over key; an antenna input/auxiliary high frequency input change-over key; a sound multiplexing key; up and down keys 36 for incrementing and decrementing the contrast of luminance and chrominance signals, the main reception channels, and the number of the main external video signal input terminal, and the sound volume respectively; an on-off key 37 for the sub-picture screen; up and down keys 38 for incrementing and decrementing the sub-reception channel and the number of the sub-external video signal input terminal; a still picture key 40; a step-by-step picture key 43; a shift key 42 used to shift the position of the sub-picture screen; and a main-sub exchange key 39 used to exchange the picture contents on the main picture and sub-picture screens.

In this embodiment of the present invention there are generally provided the same sets of control keys for the sub-picture screen as are provided for controlling the display of the main picture screen. However, not provided for the reasons given at the outset of this description are ten keys for selecting the sub-channel and a TV/VTR change-over key.

The operation of the main and sub-pictures according to the above embodiment of the present invention will now be described with reference to the flow charts of FIGS. 2A to 2D and the schematic diagrams of FIGS. 3A to 3D. It will be understood that the steps described are followed by the system controller 20 which causes each of the steps now to be described to be carried out.

Figure 3A:
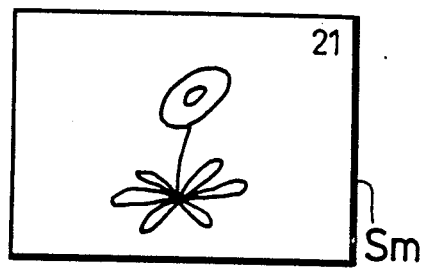
FIGS. 3A to 3D are schematic representations respectively used to explain the same.

The main picture is displayed first. In this case, when the mode change-over key 41 of the above mentioned remote controller 24 is switched to the TV mode, depressing any one of the channel selection operation keys, that is, the ten keys 35 or the up key or down key 36 increments or decrements the main channel number of the main tuner 5M to carry out the channel selection operation as shown in FIG. 2A (at step 1). Then a channel number, "21" for example, is selected as the main channel (at step 2) under the control of the system controller 20. This channel number and the channel selection data are then stored in the last condition memory 21 (at step 3). Thereafter, as shown in FIG. 3A, the picture of the channel number "21" is displayed on the main picture screen Sm and the channel number "21" is displayed thereon.

Figure 3B:
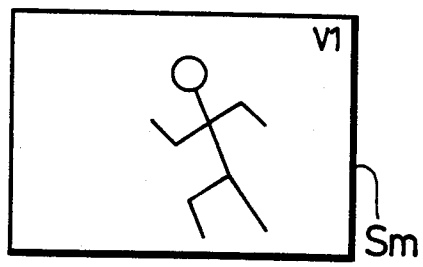

When the mode change-over key 41 of the remote controller 24 is depressed again to cause a change-over to the video mode and, for example, the video input terminal $V_1$ is selected as the main external video signal source, then the number "$V_1$" of this main external video signal source is also stored in the last condition memory 21 independently from the main channel number setting of the main tuner 5M. Then, as shown in FIG. 3B, the picture corresponding to the video signal from the source $V_1$ is displayed on the main picture screen Sm and also the number "$V_1$" of this external video signal source is displayed thereon.

A sub-picture can be subsequently displayed. In this case, at a first stage, as shown in FIG. 2B, when the on and off key 37 of the sub-picture screen on the remote controller 24 is depressed (at step 4), it is determined by the system controller 20 whether or not the sub-picture screen is displayed (at step 5). If the sub-picture screen is not displayed, the sub-picture screen is thereafter displayed and the sub-picture is displayed thereon (at step 6). If, however, the sub-picture screen is being displayed when the on and off key 37 is depressed, the sub-picture screen (and the sub-picture) is erased (at step 7). Thus each time the sub-picture screen on and off key 37 is depressed, the displayed condition of the sub-picture screen is inverted. The final displayed condition is stored each time in the last condition memory 21 (at step 8).

Further, if the up or down key 38 of the remote controller 24 for incrementing or decrementing the sub-channel number is depressed when the picture corresponding to the video signal from the sub-tuner 5S is displayed on the sub-picture screen, the channel selection operation shown in FIG. 2A is carried out, thus selecting, for example, the channel number "14" as the sub-channel. The channel number (or the number of the external video source) is stored in the last condition memory 21 similar to the case of the main channel.

Figure 2C:
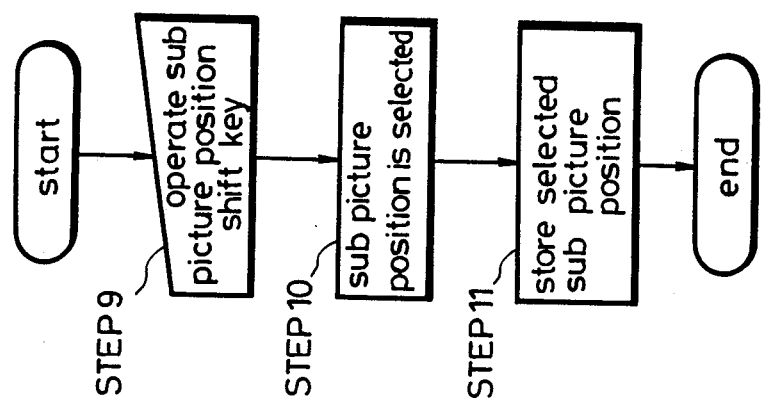

The display position of the sub-picture screen can be selected by the user. As shown in FIG. 2C, when the sub-picture position shift key 42 of the remote controller 24 is operated (at step 9), for example, the lower left-hand side corner is selected from the 4 corners of the main picture screen Sm in response to the aforementioned operation (at step 10) and this selected position is stored in the last condition memory 21 (at step 11).

Figure 3C:
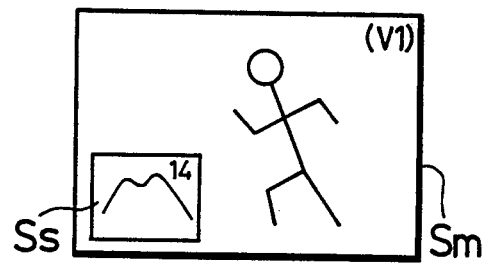

In this way, as shown in FIG. 3C, the picture of the channel number "14" is displayed on a sub-picture screen Ss placed at the lower left-hand side corner of the main picture screen Sm as the sub-picture and also its channel number "14" is displayed thereon.

Figure 3D:
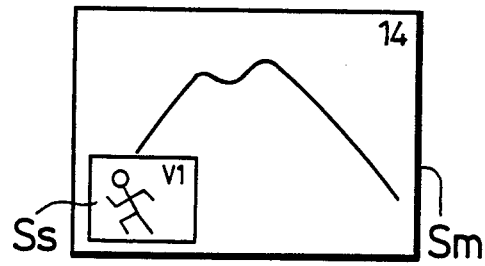

Also in this embodiment, the main and sub-pictures can be exchanged with each other. As shown in FIG. 2D, when the main/sub-exchange key 39 of the remote controller 24 for exchanging the main and sub-pictures is depressed (at step 12), the respective channel selection data of the main tuner 5M and the sub-tuner 5S or the external signal input selection for the main picture and the sub-picture which are stored in the last condition memory 21 are exchanged one after another by the system controller 20 and the operation mode data thereof are also exchanged, thereby exchanging the channels, the external signal input selection and the modes of the main and the sub-pictures (at steps 13 and 14). In the previously mentioned case, the main channel number was "21", the external signal input selected for the main picture was from source $V_1$, and the sub-channel number was "14", the main picture was set in the video mode and the sub-picture was set in the TV mode. Thus by the exchanging operation, the condition data stored at step 15 for the main picture is the TV mode with the channel number being "14" (at step 15), and the condition data stored at step 16 for the sub-picture is the video mode with the input signal selection being $V_1$. As a result, as shown in FIG. 3D, the relationship between the main picture and the sub-picture becomes just opposite to that shown in FIG. 3C.

The channel number and the external video signal number as described above are displayed on the respective picture screens Sm and Ss during a time period of, for example, several seconds each time various kinds of keys are operated.

The channel selection of the sub-channel according to the embodiment of the present invention will now be described with reference to FIGS. 4 and 5.

FIG. 4 is a flow chart to which reference will now be made in explaining the channel selection operation of the sub-channel according to the embodiment of the invention. Referring to FIG. 4, when the sub-channel up or down key 38 is depressed (at step 21), it is determined by the system controller 20 whether or not the sub-picture is set in the TV mode (at step 22).

Figure 5A:
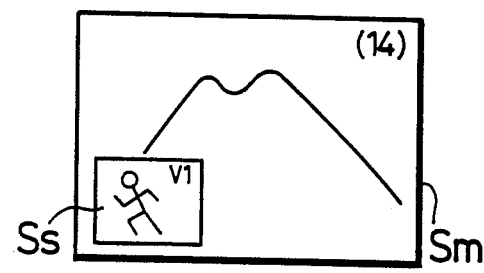
FIGS. 5A to 5C are schematic representations respectively used to explain the same.

As shown in FIG. 5A, when the television receiver is set in the same state as described before in connection with FIG. 3D, namely, the main picture is in the TV mode and the sub-picture is set in the video mode, then in response to the activation of the sub-channel up or down key 38, the operation mode of the sub-picture is automatically switched to the TV mode (at step 23) without the necessity of depressing the mode key 41. In accordance with this embodiment, when the operation mode is switched to the TV mode, the last condition memory 21 functions to first set the sub-picture at the channel number, "21" in the example above, which was stored in the memory 21 when the sub-picture was last in TV mode (at step 24).

Figure 5B:
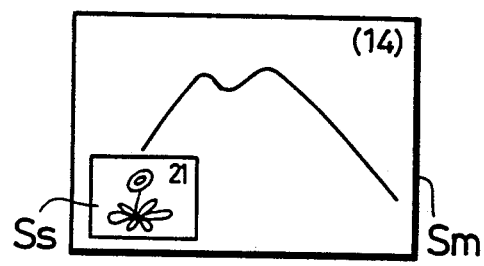

Since tne sub-channel number just after the main and sub-pictures were exchanged was "21", as described before, the condition of the memory 21 is such that the picture of the channel number "21" will be displayed on the sub-picture Ss and the number "21" of the sub-channel will be also displayed thereon, as shown in FIG. 5B. (FIG. 5B shows only the memory condition and not an actual display.)

Figure 5C:
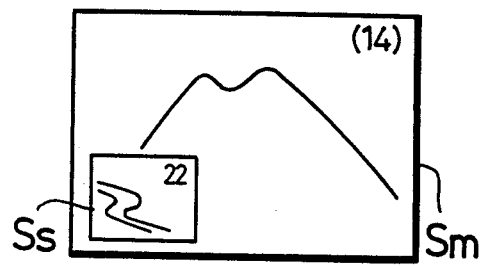

From this state, the channel selection operation is moved to the inherent channel selection operation and a channel number "22", for example, is selected as the sub-channel (at step 25) when the up key 38 is pressed at the step 21. Then, as shown in FIG. 5C, the picture of the channel "22" is displayed on the sub-picture Ss and its channel number "22" is displayed thereon.

If instead of being in the video mode, the sub-picture is set in the TV mode when the sub-channel number up or down key 38 of the remote controller 24 is operated, then the sub-channel selection operation is immediately started and a desired sub-channel is selected (at step 25).

The operation mode of the sub-picture and the channel selection data of the sub-channel changed in response to the channel selection operation and so on are then up-dated and stored in the last condition memory 21 (at step 26).

In this embodiment, when only the sub-picture is changed as mentioned above, the external video source number or the channel number of only the sub-picture is displayed and the channel number or the external video source number of the main picture is not displayed.

Furthermore, when the sub-picture is set in the video mode, the sub-picture is automatically changed-over to the TV mode by the channel selection key operation of the sub-channel. Thus, the operation mode switching key 41 of the sub-picture can be omitted, simplifying the operation for the viewer and preventing the user from being confused.

Further, in this embodiment, as shown in FIG. 5A, when the main picture is set in the TV mode and the sub-picture is set in the video mode, when the power supply to the television receiver is turned off and then later the television receiver is powered again, the micro-computer within the system controller 20 is reset and after a standby time of, for example, 0.3 seconds, the operation conditions of the respective sections of the television receiver stored in the last condition memory 21 are displayed. At that time, if the video signal is not supplied from the external video signal source, then the sub-vertical signal Vs from the sub-video/chroma signal circuit 8S is dropped and the sub-picture is disordered. Accordingly, even if the sub-picture discriminating indication signal is generated, from the sub-character display circuit 19S, the character displayed thereon by this indication signal is unreadable. Even in such case, if the sub-channel up key or down key 38 of the remote controller 24 is operated as shown in FIG. 5C, the neighboring picture channel ("22" in the example given) when the sub-picture was last set in the TV mode is displayed, thus preventing the user from being confused.

According to the present invention as set forth above in detail, since the video mode of the sub-picture is changed-over to the TV mode by operating the up key or down key 38 used in the channel selection of the sub-channel, it becomes possible to provide a television receiver of a picture-in-picture type in which the mode operation key 41 used to switch the operation mode of the sub-picture can be removed to thereby protect the user from being confused.

In this invention the external video source can be displayed in the sub-screen area only by means of the main/sub-exchange key 39, because the TV/external video change over key for the sub-picture is omitted for the sake of simplicity.

Therefore, when the viewer wants to watch a picture of an external video source on the sub-picture area, the viewer should select the picture of the external video first on the main-picture and then the viewer should depress the main/sub-change-over key 39.

Since it rarely happens that the viewer wants to start off by viewing pictures of the external video source on the sub-picture area, the omission of a sub-channel mode key poses little inconvenience to the viewer and has the advantages of simplicity of operation and compactness of the remote controller 24.

The above description is given on preferred embodiments of the present invention but it will be apparent that many modifications and variations could be effected by one skilled in the art without departing from the spirit or scope of the novel concepts of the invention so that the scope of the invention should be determined by the appended claims only.

We claim as our invention:

1. A television receiver comprising:
    (a) a cathode ray tube having a picture screen which is divisible into a main picture screen and one or more sub-picture screens inset into the main picture screen;
    (b) a main picture circuit for selecting a first video signal from a plurality of video signals and supplying it as the main picture screen video signal;
    (c) a sub-picture circuit for selecting a second video signal from a plurality of video signals, including high frequency signals and base band video signals from at least one external source, and supplying the selected second video signal as a sub-picture video signal for one or more of said sub-picture screens inset into the main picture screen of said cathode ray tube, said sub-picture circuit including viewer controllable sub-picture channel selection means for selecting said second video signal from among said high frequency signals;
    (d) a composing circuit for composing the selected video signal for the main picture screen and the selected video signal for the sub-picture screen into a composite signal which is supplied to the cathode ray tube;
    (e) a system control circuit for controlling said main picture circuit, said sub-picture circuit and said composing circuit such that when said sub-picture screen is displaying the second video signal selected from the external source and the viewer activates the sub-picture channel selection means, the system control circuit automatically causes the sub-picture circuit to change the selection of the second video signal and select the second video signal from among the high frequency signals.

2. A television receiver according to claim 1 wherein the system control circuit automatically causes the sub-picture circuit to select the second video signal from among the high frequency signals when the sub-picture channel selection means is actuated even if at the time the sub-picture channel selection means is actuated the external source is unable to supply video base band signals.

3. A picture-in-picture type television receiver having a main picture screen and a sub-picture screen displayed within the main picture screen in a picture-in-picture fashion, comprising:
    (a) a sub-picture circuit for selectively reproducing on said sub-picture screen a picture from either a broadcast channel or a picture from an external input video signal, said sub-picture circuit including viewer operable channel selection means for choosing a particular broadcast channel for reproduction on the sub-picture screen; and (b) means for causing the sub-picture circuit to reproduce a picture from a broadcast channel on said sub-picture screen if said channel selection means is operated at a time when the picture being reproduced on said sub-picture screen is an external input video signal.

4. A television receiver according to claim 3 wherein said television receiver includes viewer operable means for causing the displays of the main picture screen and the sub-picture screen to be exchanged.

5. A picture-in-picture television receiver of the type in which a sub-picture screen is inset within a main picture screen in a picture-in-picture fashion, which is able to selectively display a television channel or an external base band video signal on the sub-picture screen, and which allows a viewer to select the channel displayed on the sub-picture screen comprising:
(a) means for determining whether or not a picture on said sub-picture screen is a television channel; and
(b) means, when said picture is not a television channel, for changing said picture on said sub-picture screen to a television channel in response to a sub-picture channel selection operation.

6. A picture-in-picture type television receiver according to claims 1, 2 or 5 further comprising last condition memory means for storing, each time the sub-picture channel selection means is actuated, data representing whether the second video signal is currently one of the high frequency signals or is the base band video signal from the external source and for further storing data representing which signal constitutes the second video signal.

7. A picture-in-picture type television receiver in which a sub-picture is displayed within a main picture screen comprising:
(a) means for selecting for reproduction on the main picture screen a picture of either a broadcast channel or a picture from an external input video signal source;
(b) means for reproducing a picture of a broadcast channel on said sub-picture;
(c) main and sub-exchanging means for exchanging pictures reproduced on said main picture screen and said sub-picture;
(d) first channel selection means for said main picture screen;
(e) second channel selection means for said sub-picture; and
(f) TV and external video change over means for said main picture screen; characterized in that operation of said second channel selection means changes the sub-picture from an external video mode to a TV mode if a picture from an external video source is being reproduced on said sub-picture when said second channel selection means is operated.

* * * * *